United States Patent [19]

Herbst et al.

[11] Patent Number: 4,547,806
[45] Date of Patent: Oct. 15, 1985

[54] TWO-DIMENSIONAL SEMICONDUCTOR IMAGE SENSOR AND METHOD OF OPERATING THE SAME

[75] Inventors: Heiner Herbst, Haar; Rudolf Koch, Unterhaching, both of Fed. Rep. of Germany

[73] Assignee: Siemens Aktiengesellschaft, Berlin & Munich, Fed. Rep. of Germany

[21] Appl. No.: 511,839

[22] Filed: Jul. 8, 1983

[30] Foreign Application Priority Data

Sep. 29, 1982 [DE] Fed. Rep. of Germany ....... 3236146

[51] Int. Cl.⁴ .............................................. H04N 5/30
[52] U.S. Cl. .................................... 358/212; 258/213
[58] Field of Search ............................. 358/212, 213; 357/24 LR, 30; 250/578

[56] References Cited

U.S. PATENT DOCUMENTS 4,380,755 1/1983 Endlicher et al. .................... 382/68

OTHER PUBLICATIONS

"Solid-State Image Sensor Array Ra100×100", Reticon Corporation, Mountain View, CA, Sep. 28, 1978.
J. A. Hall, "Amplifier and Amplifier Noise Considerations", Edited by P. G. Jespers, et al., NATO Advanced Study Institute, Series E: Applied Sciences No. 16, pp. 535-559.
M. H. White, et al., "Characterization of Surface Channel CCD Image Arrays at Low Light Levels", IEEE Journal of Solid-State Circuits, vol. Sc. 9, No. 1, Feb. 1974, pp. 1-13.

Primary Examiner—Gene Z. Rubinson
Assistant Examiner—Robert Lev
Attorney, Agent, or Firm—Hill, Van Santen, Steadman & Simpson

[57] ABSTRACT

A two-dimensional semiconductor image sensor has row lines which are selectable by way of a vertical shift register to drive first selection transistors of row and column oriented sensor elements. Column lines are connected to a read-out line by way of switches which are sequentially driven by outputs of a horizontal shift register. The goal is to increase the signal-to-noise ratio and is achieved by the provision of second selection transistors for the sensor elements which are connected in series with the first selection transistors, by way of row selection transistors which connect the row lines to the outputs of the vertical shift register, and by way of a difference-forming stage which is connected to the read-out line.

8 Claims, 3 Drawing Figures

TWO-DIMENSIONAL SEMICONDUCTOR IMAGE SENSOR AND METHOD OF OPERATING THE SAME

CROSS REFERENCE TO RELATED APPLICATION

This application is related to an application entitled "Two-Dimensional Semiconductor Image Sensor Including an Arrangement for Reducing Blooming", Ser. No. 518,283, filed July 26, 1983.

BACKGROUND OF THE INVENTION

1. Field of the Invention

The present invention relates to a two-dimensional semiconductor image sensor which comprises sensor elements disposed in rows and columns on a doped semiconductor body with row lines which are selectable over assigned parallel outputs of a vertical shift register for driving first selection transistors to provide transmission paths for sensor signals thereover to column lines, and in which the column lines are successively connectible to a read-out line by way of switches driven by parallel outputs of a horizontal shift register, the read-out line exhibiting an output for the sequential reading of the sensor signals, and to a method of operating the image sensor.

2. Description of the Prior Art

A semiconductor image sensor of the type set forth above is known from the data sheet "Reticon Solid-State Image Sensor Arrays" of the Reticon Corporation, Mountain View, Calif., USA.

SUMMARY OF THE INVENTION

The object of the present invention is to increase the signal-to-noise ratio given a sensor of the type set forth above.

According to the invention, a reduction in the signal-to-noise ratio is provided in such an image sensor which is characterized in that the parallel outputs of the horizontal shift register additionally serve for column-wise driving of second selection transistors of the sensor elements; in that the second selection transistors are respectively disposed in series with the first selection transistors; in that the row lines are connected to the parallel outputs of the vertical shift register over row selection transistors; and in that a difference-forming stage is provided in series with the output of the read-out line, the difference-forming stage deriving a differential signal from two successively read signals.

The advantage which may be attained in practicing the present invention is, in particular, that the noise components occurring from the read-out line and from the column lines can be suppressed.

BRIEF DESCRIPTION OF THE DRAWINGS

Other objects, features and advantages of the invention, its organization, construction and mode of operation will be best understood from the following detailed description, taken in conjunction with the accompanying drawings, on which.

DESCRIPTION OF THE PREFERRED EMBODIMENTS

Figure 1:
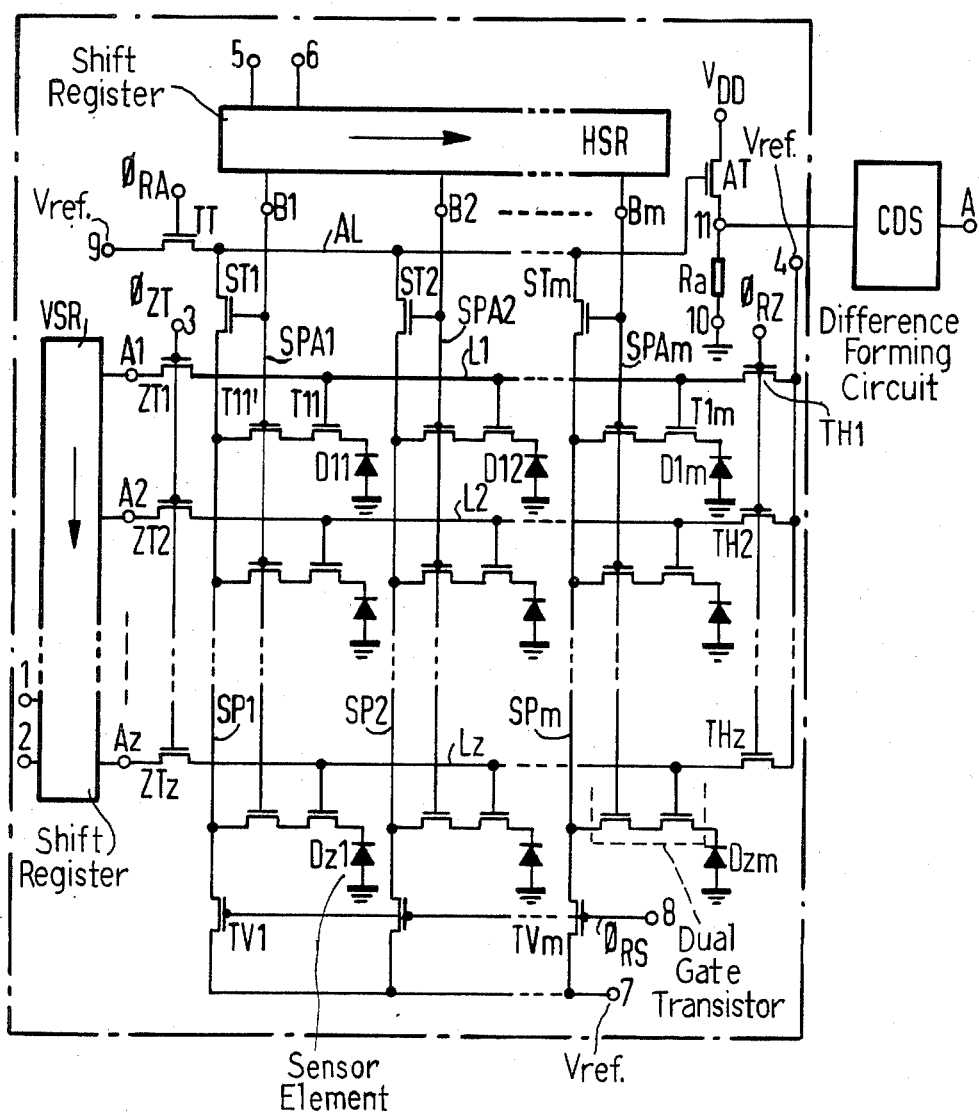
FIG. 1 is a schematic circuit diagram of a two-dimensional semiconductor image sensor constructed in accordance with the present invention.

FIG. 1 illustrates a monolithically-integratable circuit having a two-dimensional semiconductor image sensor which comprises sensor elements including photo diodes disposed in rows and columns. The photo diodes of the first row are referenced D11–D1m. The switching segments of first selection transistors T11–T1m are connected in series therewith, their gates being connected to a shared row line L1. The row line L1 is connected by way of the switching segment of a row selection transistor ZT1 to a parallel output A1 of a vertical shift register VSR which exhibits a pair of clock pulse inputs 1 and 2. The row lines L2–Lz are assigned in an analogous manner to the further photo diodes and their first selection transistors, the row lines L2–Lz being connected to the parallel outputs A2–Az of the shift register VSR by way of respective row selection transistors ZT2–ZTz. The gates of all row selection transistors ZT1–ZTz are connected to receive a clock voltage $\phi_{ZT}$. Each of the row lines L1–Lz, in addition, is connected by way of a switching transistor TH1–THz to a circuit point 4 which is connected with a reference potential $V_{ref}$. The gates of the transistors TH1–THz have a shared terminal which is connected to receive a clock voltage $\phi_{RZ}$. The lower terminals of the photo diodes D11, etc. are likewise connected to the reference potential, here ground.

Respective second selection transistors are connected in series with the first selection transistors of the sensor elements, such as the second selection transistor T11', whereby the exposure-dependent sensor signals formed in the sensor elements are respectively transmitted to a column line over the series connection of both selection transistors. In FIG. 1, for example, the diode D11 is connected to a column line SP1 by way of a first selection transistor T11 and a second selection transistor T11'. Likewise, the remaining sensor elements of the first row column up to and including the diode Dz1 are respectively connected to the column line SP1 by way of the series connections of two selection transistors. The column line SP1 is, in turn, connected by way of a column selection transistor ST1 to a read-out line AL which is, in turn, connected to the gate of an output transistor AT. The gate of the column selection transistor ST1, together with the gates of the second selection transistors which are assigned to the sensor elements of the first column, are connected by way of a column selection line SPA1 to the first parallel output B1 of a horizontal shift register HSR which is provided with clock pulse inputs 5 and 6.

In an analogous manner, a column line SP2 connected to the read-out line AL by way of a column selection transistor ST2 is assigned to the sensor elements of the second column, whereby the gate of the transistor ST2 together with the gates of the second selection transistors of the sensor elements of that column, is connected to the second parallel output B2 of the shift register HSR by way of a column selection line SPA2. Finally, the remaining columns of the sensor elements, for example, D1m–DZm, are also connected to the read-out line AL by way of column lines, for example, the column line SPm, and column selection transistors, for example the transistor STm, assigned thereto, whereby the appertaining second selection transistors and column selection transistors, for example, the transistor STm, are respectively driven from a parallel output, for example the output Bm, of the shift register HSR by way of assigned column selection lines, for example the selection SPAm. The column lines SP1–SPm are connected to a circuit point 7 lying at a reference potential $V_{ref}$ by way of the switching segments of respective transistors TV1–TVm. The gates of the transistors TV1–TVm receive a clock voltage $\phi_{RS}$ by way of a common terminal 8. The read-out line AL is connected by way of the switching segment for the transistor TT to a circuit point 9 which preferably lies at the same reference potential as the circuit point 7. The gate of the transistor TT is connected to receive a clock voltage $\phi_{RA}$.

The drain terminal of the output transistor is connected to a supply voltage $V_{DD}$, whereas its source terminal 11 is connected by way of a load resistor Ra to a circuit point 10 which, in turn, is connected to a reference potential, here again ground. The drain terminal of the transistor AT which represents the output of the read-out line AL is connected to the input of a difference-forming stage CDS whose output A forms the sensor output.

Figure 2:
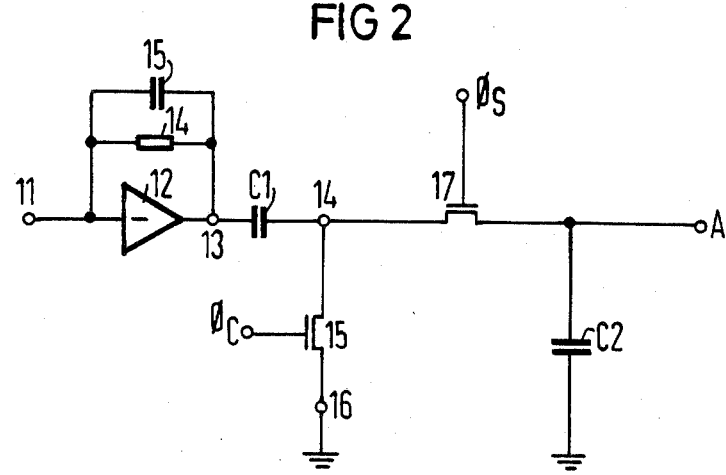
FIG. 2 is a schematic circuit diagram of a difference-forming stage which is connected in series with the output of the read-out line of the image sensor.
Figure 3:
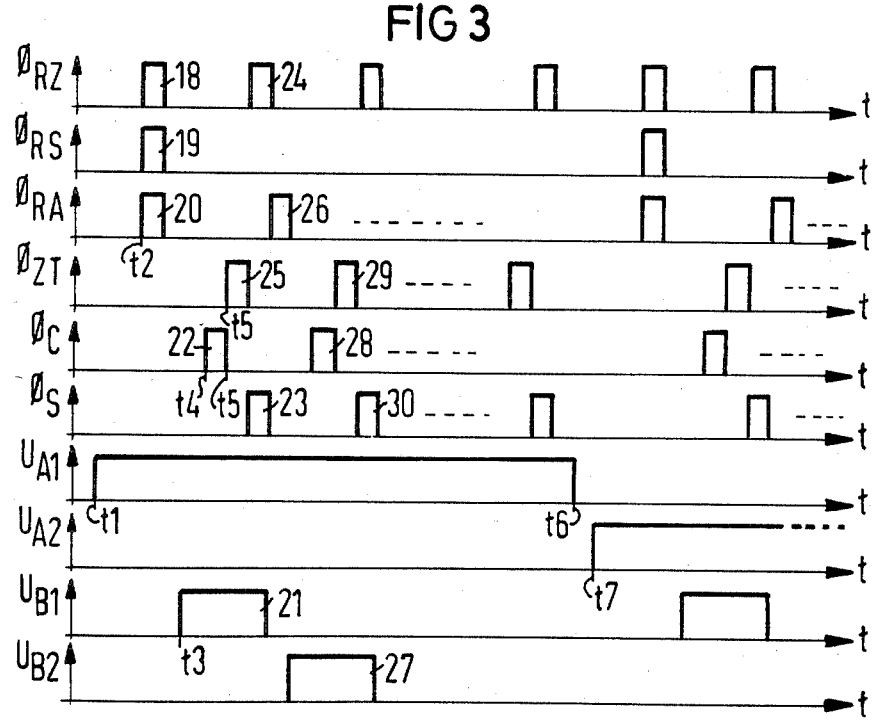
FIG. 3 is a plurality of voltage/time diagrams for explaining the operation of the image sensor of FIG. 1.

FIG. 2 is a circuit diagram of an advantageous embodiment of the difference-forming stage CDS. Given this, one proceeds from the input 11 to a preamplifier 12 whose output 13 is fed back to the input 11 by way of a parallel connection of a resistor 14 and a capacitor 15. A capacitor C1 is connected in series with the output 13, and has a terminal 14 which is connected by way of a switching transistor 15 to a circuit point 16 lying at the reference potential ground. The gate of the switching transistor 15 is connected to receive a clock voltage $\phi_C$. The terminal 14 is connected by way of a switching segment of a switching transistor 17 to the first terminal of a capacitor C2 whose second terminal is connected to the reference potential. The first terminal of the capacitor C2 simultaneously forms the output A of the stage CDS and, therefore, the output of the image sensor. The circuit elements 17 and C2 form a sample and hold stage. The gate of the transistor 17 is thereby connected to receive a clock voltage $\phi_S$.

A difference-forming stage of the type described can be derived, for example, from the book by P.G. Jaspers et al (Solid-State Imaging) from the series "NATO Advanced Study Institutes", Series E, No. 16, 1976, Verlag, Noordhoff International Publishing, Leyden, pp. 535–559, with particular reference to FIG. 9. Such a stage which is similarly constructed can be derived from the I.E.E.E. Journal of Solid State Circuits, Vol. SC-9, No. 1, Feb. 1974, pp. 1–13, with particular reference to FIG. 5.

The shift registers VSR and HSR are preferably designed as two-phase, dynamic fedback shift registers. In the shift register VSR, a logical "1" is shifted from stage-to-stage as a function of two clock pulse voltages supplied to the inputs 1 and 2. The transfer direction is indicated by an arrow. One proceeds on the assumption that a logical "1" is applied to the output A1 of the first stage of the shift register VSR at a specific time t1, whereby the voltage appearing at the output A1 is referenced $U_{A1}$. After the appearance of the next successive clock pulses at the inputs 1 and 2, the logical "1" has then shifted in the direction of the arrow to such a degree that it is applied to the second parallel output A2 as a voltage $U_{A2}$. This forwarding of the "1" is continued until the output $A_z$ of the last stage is occupied with the voltage "1". The next successive clock pulses at 1 and 2 then return the logical "1" to the output A1 of the first stage. The outputs of the respective stages not having a logical "1" lie at the logic potential "0".

The shift register HSR is operated in the same manner by way of two clock pulse voltages supplied to the inputs 5 and 6. A logical "1" is therefore shifted in the direction of the arrow in the sequence of the clock pulse voltage, this leading to voltages $U_{V1}$, $-U_{V2}$, etc, at the parallel outputs B1, B2, etc.

As a result of the appearance of the voltage $U_{A1}$ at the time t1, the first row of sensor elements, i.e. D11–D1m, is selected for read-out. However, the transistor ZT1 is still blocked, initially. Subsequently, the row lines are set to reference potential at a time t2 by way of the clock pulse 18 of the clock $\phi_{RZ}$, whereas the column lines and the read-out line are respectively reset to a reference potential by way of the clock pulses 19 and 20 of the clock voltages $\phi_{RS}$ and $\phi_{RA}$. A pulse 21 of the voltage $U_{B1}$ follows at the time t3, this selecting the line STA1 and thereover, switching all second selection transistors T11′, etc of the first sensor column as well as the column selection transistor ST1 so that the transistor ST1 is connected to the read-out line AL. The momentary value of the noise on the column line SP1 and on the read-out line AL, as well as the interfering voltage inputs occurring due to the transistors T11′, etc of the first sensor column and the transistor ST1, are stored with a negative operational sign in the capacitor C1 due to a pulse 22 (t4) of the clock $\phi_C$ which switches on the switching transistor 15. Subsequently, i.e. at a time t5, all first selection transistors T11–T1m of the selected row are switched on by way of a pulse 25 of the clock $\phi_{ZT}$. The sensor element D11, which is identified by the intersection of the selected lines L1 and SPA1 is thereby read. The read-out sensor signal which is likewise affected with the momentary value of the noise on the line SP1 and the line AL, as well as with the interfering voltage inputs, is superimposed with a positive operational sign on the signal previously stored in the capacitor C1, being superimposed at a time t5 after inhibit of the switching transistor 15 (FIG. 2) so that a sensor signal rid of the noise components and interfering voltage inputs occurs at the circuit point 14 as the difference of two successively-read signals. As a result of a pulse 23 of the clock $\phi_S$, the signal value therefore obtained is transmitted by way of the transistor 17 to the capacitor C2 and is stored so that it may be tapped at the output A. What is achieved by way of the clock pulse 24 of the clock $\phi_{RZ}$ after conclusion of the clock pulse 25 of the clock $\phi_{ZT}$ is that a noise voltage input onto the line SP1 arises by way of the transistor T11, this largely compensating the interfering voltage input arising at the time t5 upon switch-on of the transistor so that these inputs can be neglected.

Before the read-out of the next sensor element D12 of the first row, the row lines are again set at reference potential by way of the pulse 24 and the read line is again switched to the reference potential by way of the pulse 26. In addition to the line L1 which is still selected, the line SPA2 is now selected by a pulse 27 of $U_{B2}$. In the manner already described, pulses 28–30 effect the transfer of the sensor signal on the sensor element D2, rid of noise components, the column line SP2 and the read-out line AL, as well as of the interfering voltage inputs of the participating switching transistors to the capacitor C2 and, therefore, to the output A.

The further sensor elements of the first row through the element D1m are sequentially read in the same manner. Thereafter, the voltage $U_{A1}$ is disconnected from the output A1 (t6) and the next parallel output A2 of the shift register VSR is charged with the voltage $U_{A2}$ (t7). The sequential reading operation described above is subsequentially repeated for the sensor elements of the second row. The sensor elements of the remaining image sensor rows are also read in an analogous manner. The complete reading operation of the overall image sensor is periodically repeated.

The reading method described above for the sensor constructed in accordance with the present invention allows a largely low-noise and interference-free reading of the sensor signals, even given large number of rows and large numbers of columns, although, in this case, the reset noise of the column lines SP1, etc, and of the read-out line AL, derives from higher noise charges because of the correspondingly-increased line lengths and the higher line capacitances connected therewith. As a result of the present invention, these noise charges are largely compensated in the stage CDS during the differential formation concerning the signals respectively read in immediate succession.

The first and second selection transistors, for example the transistors T11 and T11', of the individual sensor elements can be combined in a space-saving manner to form a dual-gate transistor. The gate of the transistor T11' can thereby be formed of a first layer of polycrystalline silicon and the gate of the transistor T11 can be formed of a second such layer.

Although we have described our invention by reference to a particular illustrative embodiment thereof, many changes and modifications of the invention may become apparent to those skilled in the art without departing from the spirit and scope of the invention. I therefore intend to include with the patent warranted hereon all such changes and modifications as may reasonably and properly be included within the scope of my contribution to the art.

We claim:

1. In a two-dimensional image sensor of the type wherein a plurality of sensor elements are carried in columns and rows by a doped semiconductor body, wherein row lines are selected by way of assigned parallel outputs of a row shift register to selectively drive first switching transistors connected to the sensor elements for transmitting exposure-dependent sensor signals, formed in the sensor elements, over the first switching transistors to respective column lines, wherein the column lines are successively connected to a readout line connected to a read output for reading the sensor signals via respective column read-out second switching transistors driven by parallel outputs of a column shift register, the improvement therein comprising:
    a plurality of third switching transistors each connected in series with a respective first switching transistor and connected to and operated by a respective output of the column shift register;
    a plurality of clock-driven fourth switching transistors each connecting a respective row line to a respective output of the row shift register; and
    a difference-forming stage connected to the read-output and operable to produce a difference signal from two successive read sensor signals.

2. The improved two-dimensional image sensor of claim 1, wherein said difference-forming stage comprises:
    a preamplifier including an input connected to the read output, and an output;
    a capacitor including a first terminal connected to said output of said preamplifier, and a second terminal;
    a clock-driven switch connected between said second terminal and a reference potential; and
    a sample and hold circuit connected to said second terminal of said capacitor for sampling and intermediately storing signals received via said preamplifier and said capacitor.

3. The improved two-dimensional image sensor of claim 2, wherein said sample and hold circuit comprises:
    an output;
    a further capacitor including a first terminal connected to said output and forming the output of the image sensor,
    and a second terminal connected to the reference potential; and
    a clock-driven switch connected between said second terminal of the first-mentioned capacitor and said first terminal of said second capacitor.

4. The improved two-dimensional image sensor of claim 1, and further comprising:
    a plurality of clock-driven fifth switching transistors each connected between a respective row line and a reference potential.

5. The improved two-dimensional image sensor of claim 4, and further comprising:
    a plurality of clock-driven sixth switching transistors each connected between a respective column line and the reference potential.

6. The improved two-dimensional image sensor of claim 1, wherein:
    a respective dual gate transistor constitutes each series-connected first and third switching transistors.

7. A method of operating a two-dimensional image sensor of the type wherein a plurality of sensor elements are carried in columns and rows by a doped semiconductor body, wherein row lines are selected by way of assigned parallel outputs of a row shift register to selectively drive first switching transistors connected to the sensor elements for transmitting exposure-dependent sensor signals, formed in the sensor elements, over the first switching transistors to respective column lines, wherein the column lines are successively connected to a read-out line connected to a read output for reading the sensor signals via respective column read-out second switching transistors driven by parallel outputs of a column shift register, wherein a plurality of third switching transistors is provided with each connected in series with a respective first switching transistor and connected to and operated by a respective output of the column shift register, wherein a plurality of clock-driven fourth switching transistors is provided with each connecting a respective row line to a respective output of the row shift register, and wherein a difference-forming stage is connected to the read output and operable to produce a difference signal from two successive read sensor signals, comprising the steps of:
    selecting a row of sensor elements by applying a selection potential to the respective fourth switching transistor and simultaneously maintaining that transistor blocked;

sequentially selecting each column by sequentially applying an enabling potential to the respective second and third switching transistors to render the same conductive;

transmitting the noise and interference voltages generated by such switching on the read-out line and the column line to the difference-forming stage and storing such signals with a first operational sign;

driving the respective fourth switching transistor to render the first switching transistors of the selected row conductive and transmit the respective sensor signal to the difference-forming stage along with noise and interference signals generated and superimposing the same, with an opposite, second operational sign, on the stored noise and interference voltages to produce a difference signal as an image sensor output signal; and repeating the above steps sequentially for each row.

8. The method of claim 7, and further comprising the steps of:

resetting the column lines, the row lines and the read-out line to a reference potential prior to applying an enabling potential to the respective second and third switching transistors.

* * * * *